(12) United States Patent
Wang et al.

(10) Patent No.: US 7,986,514 B2
(45) Date of Patent: Jul. 26, 2011

(54) ELECTRONIC APPARATUS HAVING MOVABLE INPUT DEVICE

(75) Inventors: Tzu-Ming Wang, Hsinchu (TW);
Chi-Tsan Shen, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 93 days.

(21) Appl. No.: 12/484,220

(22) Filed: Jun. 14, 2009

(65) Prior Publication Data
US 2010/0277859 A1 Nov. 4, 2010

(30) Foreign Application Priority Data

Apr. 29, 2009 (TW) .............................. 98114282 A

(51) Int. Cl.
*G06F 1/16* (2006.01)
(52) U.S. Cl. .............................. 361/679.02; 361/679.16
(58) Field of Classification Search ............. 361/679.02, 361/679.11, 679.15, 679.16, 679.17
See application file for complete search history.

(56) References Cited

U.S. PATENT DOCUMENTS

| | | | | |
|---|---|---|---|---|
| 5,187,644 A * | 2/1993 | Crisan | ....................... | 361/679.16 |
| 5,712,760 A * | 1/1998 | Coulon et al. | ........... | 361/679.15 |
| 6,297,752 B1 * | 10/2001 | Ni | ................................. | 341/22 |
| 6,580,932 B1 * | 6/2003 | Finke-Anlauff | .............. | 455/566 |
| 6,628,508 B2 * | 9/2003 | Lieu et al. | ................. | 361/679.09 |
| 6,748,242 B1 * | 6/2004 | Dunleavy | ....................... | 455/566 |
| 6,801,796 B2 * | 10/2004 | Finke-Anlauff | ........... | 455/575.3 |
| 6,983,175 B2 * | 1/2006 | Kwon | ......................... | 455/575.1 |
| 6,989,984 B2 * | 1/2006 | Sutton et al. | ............. | 361/679.16 |
| 7,016,182 B2 * | 3/2006 | Brandenberg et al. | ... | 361/679.06 |
| 7,031,143 B2 * | 4/2006 | Madsen et al. | ............. | 361/679.2 |
| 7,050,767 B2 * | 5/2006 | Hickey et al. | ................ | 455/90.3 |
| 7,221,560 B2 * | 5/2007 | Varela | ....................... | 361/679.08 |
| 7,269,450 B2 * | 9/2007 | Lee et al. | .................... | 455/575.1 |
| 7,333,321 B2 * | 2/2008 | Sutton et al. | ............. | 361/679.09 |
| D583,810 S * | 12/2008 | Chen | ............................ | D14/345 |
| 7,539,526 B2 * | 5/2009 | Pirila et al. | ................. | 455/575.3 |
| D597,091 S * | 7/2009 | Varela | ......................... | D14/346 |
| D597,092 S * | 7/2009 | Wang et al. | .................... | D14/346 |
| 2002/0006815 A1 * | 1/2002 | Finke-Anlauff | .............. | 455/575 |
| 2004/0048632 A1 * | 3/2004 | Kuroda | ....................... | 455/550.1 |
| 2005/0020323 A1 * | 1/2005 | Kim | ............................ | 455/575.1 |
| 2005/0054393 A1 * | 3/2005 | Fagerstrom et al. | ....... | 455/575.1 |
| 2005/0105256 A1 * | 5/2005 | Chuang | .......................... | 361/680 |
| 2006/0202963 A1 * | 9/2006 | Hermann | ...................... | 345/168 |
| 2007/0037618 A1 * | 2/2007 | Lee | ............................. | 455/575.4 |
| 2010/0148642 A1 * | 6/2010 | Eromaki et al. | ............ | 312/223.1 |
| 2010/0277859 A1 * | 11/2010 | Wang et al. | ............... | 361/679.21 |

* cited by examiner

*Primary Examiner* — Lisa Lea-Edmonds
(74) *Attorney, Agent, or Firm* — Chun-Ming Shih

(57) ABSTRACT

An electronic apparatus having movable input device includes a main body and two input devices. The main body includes a shell, a display panel and a processing unit. The display panel and the processing unit are received in the shell. A display surface of the display panel is exposed from the shell. The two input devices are coupled to two opposite sides of the shell respectively and electrically connect to the processing unit. The two input devices are configured for being slid or rotated relative to the shell so as to be received by the shell, thereby facilitating to reduce the volume of the electronic apparatus.

5 Claims, 6 Drawing Sheets

ELECTRONIC APPARATUS HAVING MOVABLE INPUT DEVICE

CROSS-REFERENCE TO RELATED APPLICATIONS

This application is based upon and claims the benefit of priority from the prior Taiwanese Patent Application No. 098114282, filed Apr. 29, 2009, the entire contents of which are incorporated herein by reference.

BACKGROUND

1. Field of the Invention

The present invention relates to an electronic apparatus, and particularly to an electronic apparatus having movable input device.

2. Description of the Related Art

In recent years, with the development of the electronic technology, using electronic apparatuses for either business or personal uses has become a popular trend. Electronic apparatuses have various functions to accommodate various demands of the users. The common electronic apparatuses include, for example, mobile telephones, electronic book apparatuses, personal digital assistants (PDAs), all-in one personal computers, tablet personal computers, multimedia players and portable game players, and so on. At the same time, in order to make the electronic apparatuses to have fashion appearance and to be used conveniently, the electronic apparatuses have a development trend of lightness, thinness and smallness. Nowadays, keyboard input devices of a lot of electronic apparatuses are replaced with handwriting input devices so as to reduce the volume of the electronic apparatuses. However, the electronic apparatus equipped with the handwriting input device will cause some troubles to the user who is used to use the keyboard input device. Additionally, even if some electronic apparatuses were equipped with keyboard input devices, the keyboard input devices usually are fixed coupling to the electronic apparatuses or are served as outside connecting components. Such designs of the keyboard input devices have some disadvantageous in use and in function.

For example, a typical electronic book apparatus is equipped with an input device coupled to the bottom of the electronic book apparatus. Such design of the input device can not facilitate reducing the volume of the electronic book apparatus. Furthermore, such design of the input device does not base on the ergonomics theory and can not provide the user an input function based on the principles of ergonomics. For another example, a typical all-in one personal computer is equipped with an input device such as a keyboard that is coupled to the all-in one personal computer through an outside connector. Similarly, such design of the input device can not facilitate reducing the volume of the whole all-in one personal computer including the input device yet.

Therefore, what is needed is an electronic apparatus to overcome the disadvantages of the typical electronic apparatuses having input devices described above.

BRIEF SUMMARY

The present invention provides an electronic apparatus having movable input device that is capable of being received by the shell of the electronic apparatus so as to facilitate reducing the volume of the electronic apparatus.

The present invention also provides an electronic apparatus having movable input device that has a supporting function.

The present invention provides an electronic apparatus having movable input device. The electronic apparatus includes a main body and two input devices. The main body includes a shell, a display panel and a processing unit. The display panel and the processing unit are received in the shell. A display surface of the display panel is exposed from the shell. The two input devices are coupled to two opposite sides of the shell respectively and electrically connect to the processing unit. The two input devices are configured for being slid or rotated relative to the shell so as to be received by the shell.

In one embodiment provided by the present invention, the shell includes a front surface, a rear surface, a top surface, a bottom surface and two opposite side surfaces. The display surface of the display panel is exposed from the front surface. The front surface is on an opposite side of the shell to the rear surface. The bottom surface is on an opposite side of the shell to the top surface. The two side surfaces are adjacent to the front surface, the rear surface, the top surface and the bottom surface. The input devices are coupled to the two side surfaces respectively.

In one embodiment provided by the present invention, the input devices are respectively pivoted to the shell via a respective pivoting shaft and are configured for being received on the rear surface of the shell. Each pivoting shaft is substantially perpendicular to the top surface and the bottom surface of the shell.

In one embodiment provided by the present invention, each of the input devices is configured for being rotated between a first position and a second position. Each of the input devices has an operating surface. When the input device is rotated to the first position, the operating surface and the front surface face to an identical direction. When the input device is rotated to the second position, the input device is received on the rear surface of the shell, and the operating surface and the rear surface face to an identical direction.

In one embodiment provided by the present invention, a rotating angle of the input device from the first position to the second position is 180 degrees.

In one embodiment provided by the present invention, the input devices are respectively pivoted to the shell via a respective pivoting shaft and are configured for being received on the rear surface of the shell. Each pivoting shaft is substantially perpendicular to the front surface and the rear surface of the shell.

In one embodiment provided by the present invention, each of the side surfaces defines an opening. The input devices are respectively pivoted to the shell via a respective pivoting shaft and are configured for being received in the shell through the opening. The pivoting shafts are substantially perpendicular to the front surface and the rear surface of the shell.

In one embodiment provided by the present invention, the input devices are coupled to the shell slidablely. The input devices are configured for being slid relative to the shell so as to be received on the rear surface of the shell.

In one embodiment provided by the present invention, the two side surfaces define an opening respectively. The input devices are respectively coupled to the shell slidably and are configured for being slid to be received in the shell through the openings.

In one embodiment provided by the present invention, the input devices are near to the bottom surface of the shell.

In one embodiment provided by the present invention, the input devices are selected from a group consisting of a keyboard, a handwriting board and a pointing device.

In one embodiment provided by the present invention, the pointing device is selected from a group consisting of a touch pad, a trackball device and a trackpoint device.

In one embodiment provided by the present invention, the display panel is selected from a group consisting of an electrophoretic display panel, a liquid crystal display panel, a liquid powder display panel, a micro-electromechanical display panel, an electrowetting display panel, an organic light emitting diode display panel and a plasma display panel.

In one embodiment provided by the present invention, the electronic apparatus is selected from a group consisting of an electronic book apparatus, a personal digital assistant, an all-in one personal computer, a tablet personal computer, a mobile telephone, a multimedia player and a portable game player.

The present invention also provides another electronic apparatus having movable input device. The electronic includes a main body and an input device. The main body includes a shell, a display panel and a processing unit. The display panel and the processing unit are received in the shell. A display surface of the display panel is exposed from the shell. The shell defines an opening. The input device is coupled to the shell and electrically connects to the processing unit. The input device is configured for being slid or rotated relative to the shell so as to be received in the shell through the opening.

In one embodiment provided by the present invention, the display surface of the display panel is exposed from the front surface of the shell. The input device is pivoted to the shell via a pivoting shaft. The pivoting shaft is substantially perpendicular to the front surface of the shell.

In one embodiment provided by the present invention, the display surface of the display panel is exposed from the front surface of the shell. The input device is coupled to the shell slidably.

The electronic apparatus of the present invention have two input devices coupled to the two opposite sides of the shell of the electronic apparatus respectively. The structure is designed based on the ergonomics theory and the user can input data conveniently using the two input devices. In addition, the two input devices have an accessorial supporting function so that the user can read the information displayed on the displaying surface conveniently. Moreover, the input devices are configured for being either slid or rotated relative to the shell to be received by the shell, thereby facilitate reducing the volume of the electronic apparatus.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
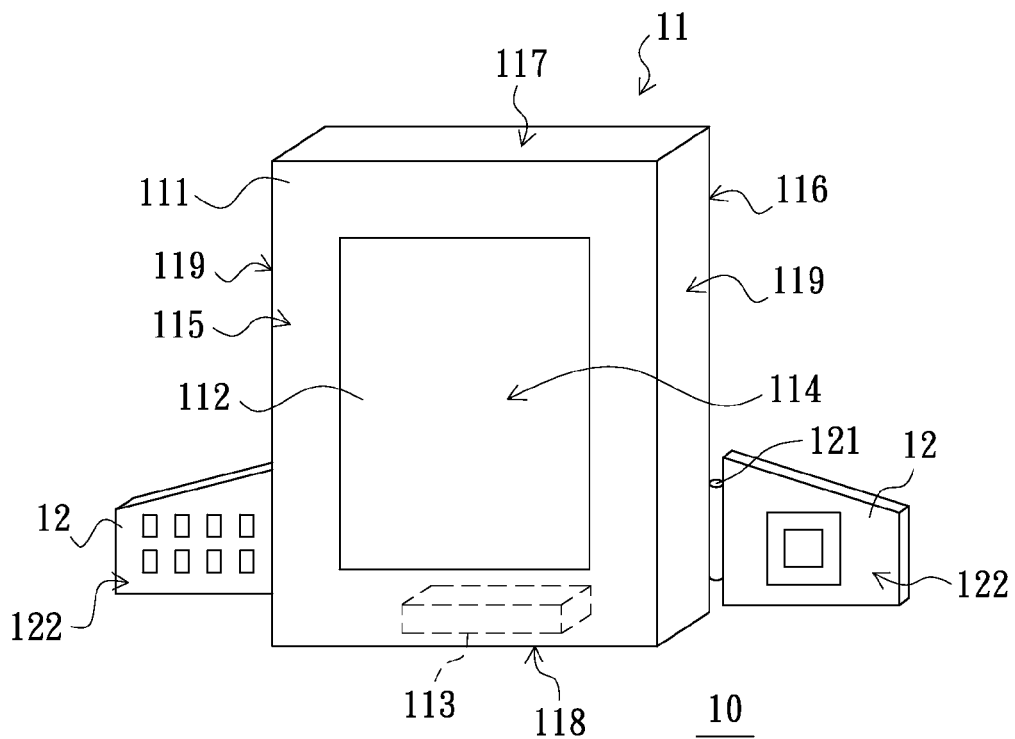
FIG. 1 is a schematic view of an electronic apparatus having two movable input devices in accordance with a first embodiment of the present invention.

FIG. 1 is a schematic view of an electronic apparatus having two movable input devices in accordance with a first embodiment of the present invention. Referring to FIG. 1, in the first embodiment, the electronic apparatus 10 having two movable input devices 12 can be, but not limited to, an electronic book apparatus, a personal digital assistant, an all-in one personal computer, a tablet personal computer, a mobile telephone, a multimedia player or a portable game player.

The electronic apparatus 10 includes a main body 11 and two input devices 12 coupled to the main body 11. The main body 11 includes a shell 111, a display panel 112 and a processing unit 113. The shell 111 is configured for receiving the display panel 112, the processing unit 113 and other components (not shown) for achieving the electronic functions of the electronic apparatus 10. The display panel 112 and the input devices 12 are electrically connected to the processing unit 113. The display panel 112 has a display surface 114 exposed from the shell 111. The display surface 114 is configured for displaying information and image so that the user can read the information and image from the display surface readily.

The display panel 112 can be selected from a group consisting of an electrophoretic display panel, a liquid crystal display panel, a liquid powder display panel, a micro-electromechanical display panel, an electrowetting display panel, an organic light emitting diode display panel and a plasma display panel. The processing unit 113 is configured for processing the data so as to carry out the corresponding functions of the electronic apparatus 10. It is well known for one skilled in the art to understand the operating principle of the processing unit 113, and the operating principle of the processing unit 113 is not described here. The two input devices 12 are respectively electrically connected to the processing unit 113 so as to transmit signals to the processing unit 113.

The shell 111 can be designed according to the demand of the electronic apparatus 10. In the present embodiment, the shell 111 includes a front surface 115, a rear surface 116, a top surface 117, a bottom surface 118 and two opposite side surfaces 119. The front surface 115 is on an opposite side of the shell 111 to the rear surface 116. The bottom surface 118 is on an opposite side of the shell 111 to the top surface 117. The two side surfaces 119 are adjacent to the front surface 115, the rear surface 116, the top surface 117 and the bottom surface 118. In the present embodiment, the two input devices 12 are coupled to the two side surfaces 119 respectively. The display surface 114 of the display panel 112 is exposed from the front surface 115.

Each of the input devices 12 has an operating surface 122. The user can control the electronic apparatus 10 by the operating surface 122. The two input devices 12 can be selected from a group consisting of a keyboard, a handwriting board and a pointing device. The pointing device can be a touch pad, a trackball device or a trackpoint device. In the present embodiment, the two input devices 12 are near to the bottom surface 118 of the shell 111. One input device 12 is a keyboard and the other input device 12 is a touch pad.

In the present embodiment, the two input devices 12 are coupled to the two opposite side of the shell 111 and are configured for being rotated relative to the shell 111 so as to be received by the shell 111. In detail, the two input devices 12 are coupled to the two opposite side surfaces 119 via a respective pivoting shaft 121. Each pivoting shaft 121 is substantially perpendicular to the top surface 117 and the bottom surface 118 of the shell 111. Thus, the two input devices 12 can be rotated relative to the shell 111.

Figure 2:
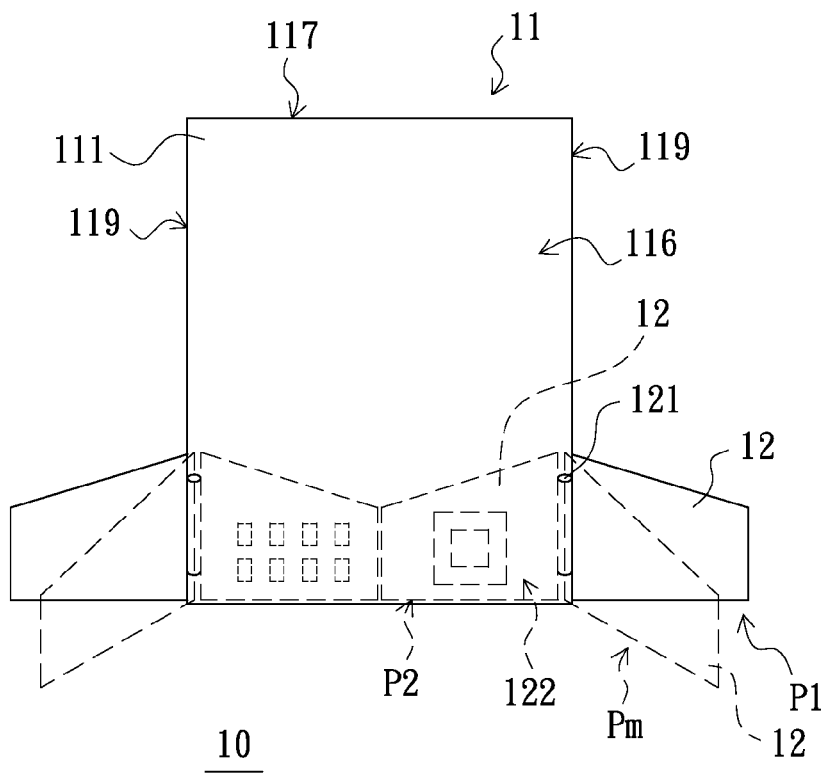
FIG. 2 is a schematic view of the input devices of the electronic apparatus in accordance with the first embodiment of the present invention, which are rotated to various positions.

FIG. 2 is a schematic view of the input devices of the electronic apparatus shown in FIG. 1, which are rotated to various positions. Referring to FIG. 2, each of the input devices 12 is configured for being rotated between a first position P1 and a second position P2. When each of the input devices 12 is rotated to the first position P1 (see FIG. 1), the two input devices 12 are in an extending state. In the extending state, the operating surfaces 122 of the two input devices 12 and the front surface 115 of the shell 111 face to an identical direction. The two input devices 12 are located at the two opposite sides of the main body 11, which is based on the ergonomics theory. Thus, the user can input data using the two input devices 12 conveniently. When each input device 12 is rotated to the second position P2, the two input devices 12 are in a hidden state. In the hidden state, the operating surfaces 122 of the two input devices 12 and the rear surface 116 of the shell 111 face to an identical direction, and the two input device 12 are received on the rear surface 116 of the shell 111. Thus, the volume of electronic apparatus 10 can be reduced so that the electronic apparatus 10 can be carried conveniently.

Figure 3:
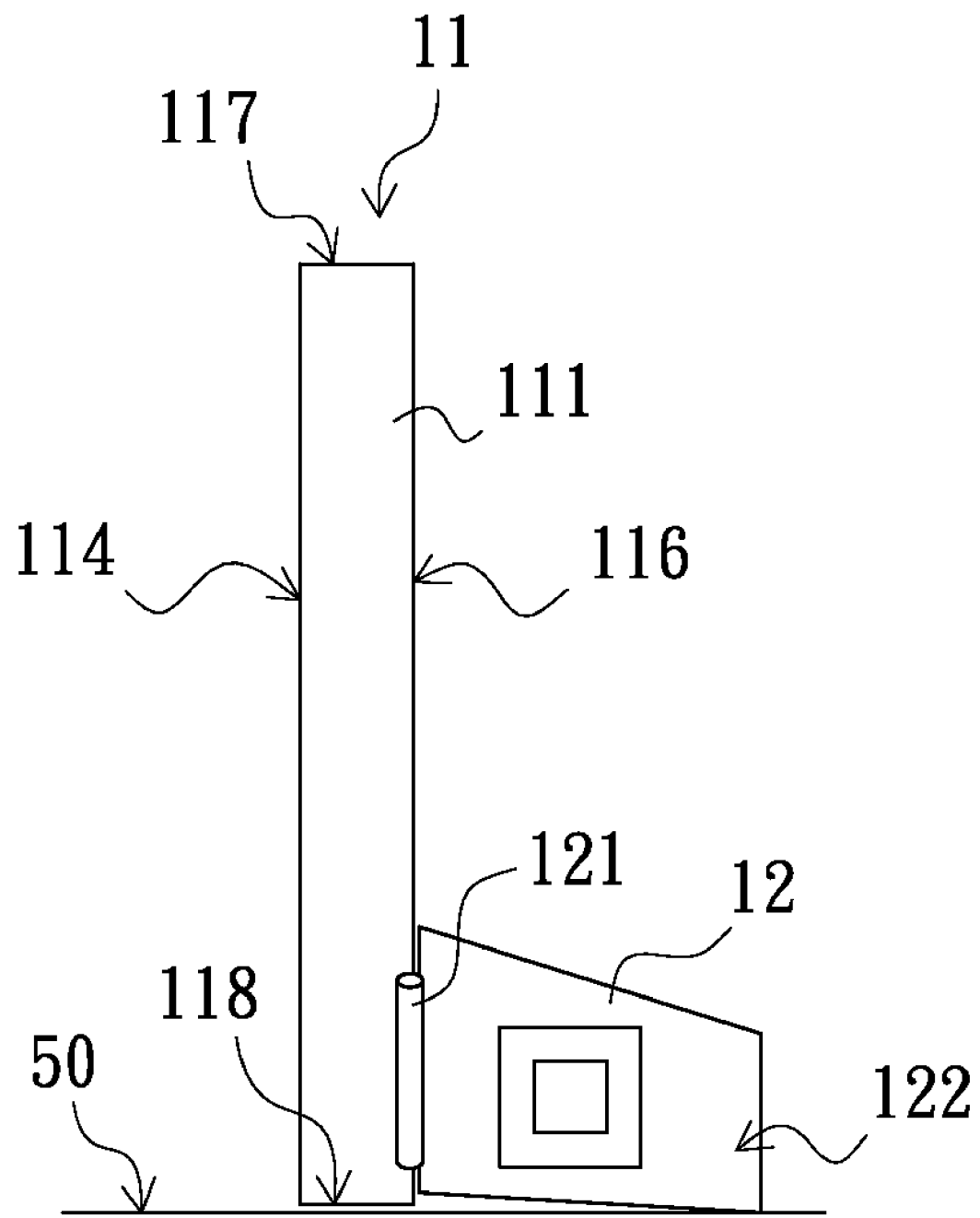
FIG. 3 is a schematic view of the input devices of the electronic apparatus in accordance with the first embodiment of the present invention, which are configured for supporting the main body of the electronic apparatus.

In the present embodiment, when each of the input devices 12 is rotated from the first position P1 to the second position P2, a rotating angle of each of the input devices 12 is, for example, 180 degrees. When the rotating angle of the input device 12 from the first position P1 to the second position P2 is between 0 and 180 degrees, the input device 12 is located at a middle position Pm. Referring to FIG. 3, when the two input devices 12 are rotated to a certain rotating angle, the two input devices 12 can have an accessorial supporting function. At this time, the bottom surface 118 of the shell 111 is attached to a table surface 50 and the two input devices 12 are attached to the table surface 50 simultaneously, thereby forming a support for the main body 11. Thus, the main body 11 can stand up so that the user can read the information displayed on the display surface 114 conveniently.

It is noted that the two input devices 12 can have an identical rotating angle. Also, the two input devices 12 can have different rotating angles.

Figure 4:
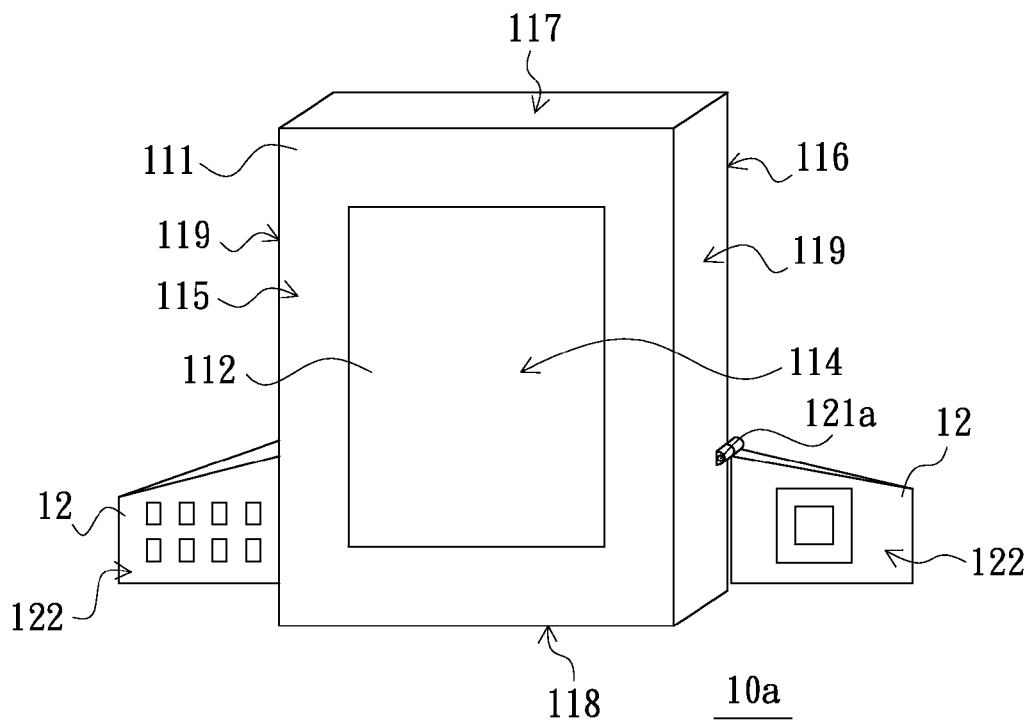
FIG. 4 is a schematic view of an electronic apparatus having two movable input devices in accordance with a second embodiment of the present invention.

FIG. 4 is a schematic view of an electronic apparatus having two movable input devices in accordance with a second embodiment of the present invention. Referring to FIG. 4, the electronic apparatus 10a in the second embodiment is similar to the electronic apparatus 10 in the first embodiment except the coupling structure of the two input devices 12 and the shell 111. In the present embodiment, the two input devices 12 of the electronic apparatus 10a are coupled to the two opposite side surfaces 119 via a respective pivoting shaft 121a. Each of the pivoting shafts 121a is substantially perpendicular to the front surface 115 and the rear surface 116 of the shell 111. Thus, the two input devices 12 can be rotated relative to the shell 111.

Figure 5:
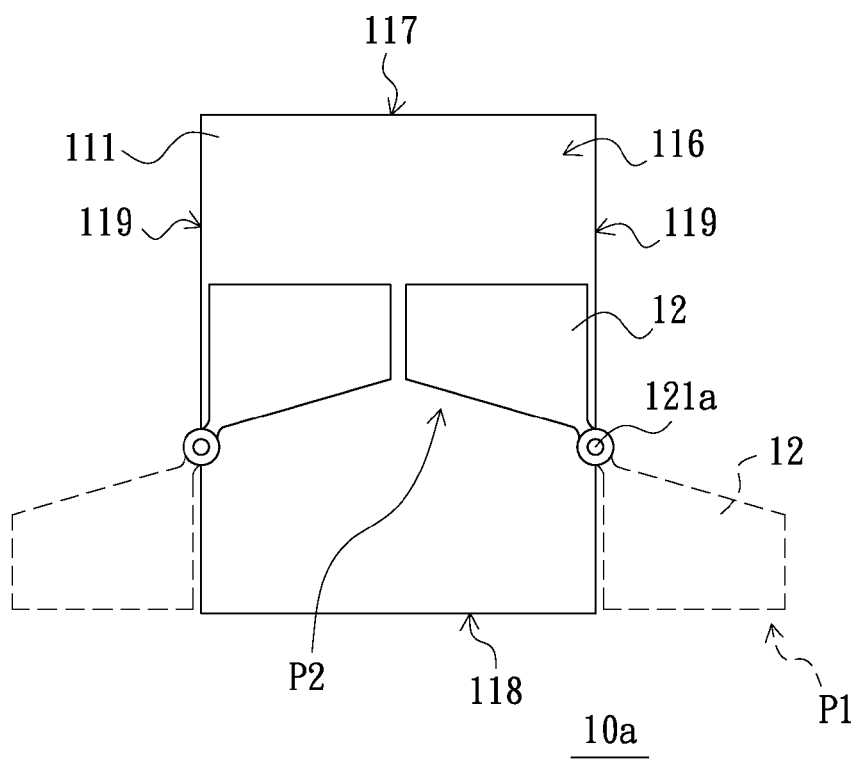
FIG. 5 is a schematic view of the input devices of the electronic apparatus in accordance with the second embodiment of the present invention, which are rotated to various positions.

In detail, the two input devices 12 are rotated around the respective pivoting shaft 121a, thereby achieving rotation relative to the shell 111 to be received on the rear surface 116 of the shell 111 (see FIG. 5). Thus, the volume of electronic apparatus 10a can be reduced so that the electronic apparatus 10a can be carried conveniently. It is noted that the coupling structure of the input devices 12 and the shell 111 is not limited by the first embodiment and the second embodiment. Any coupling structure of the input devices 12 and the shell 111 that is configured for rotating the input devices 12 relative to the shell 111 to receive the input devices 12 on the rear surface 116 of the shell 111 can be feasible.

Figure 6:
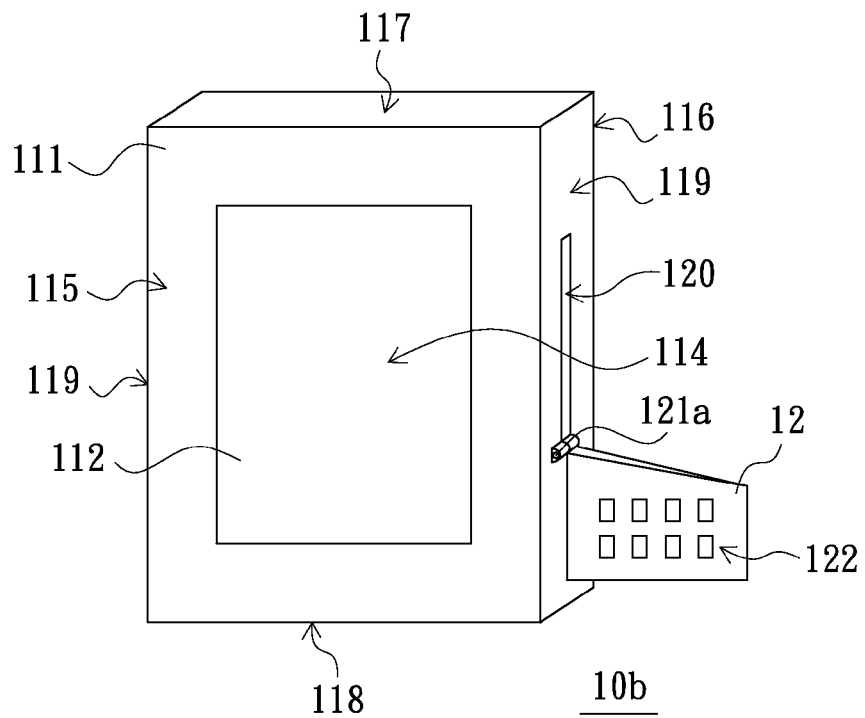
FIG. 6 is a schematic view of an electronic apparatus having a movable input device in accordance with a third embodiment of the present invention.
Figure 7:
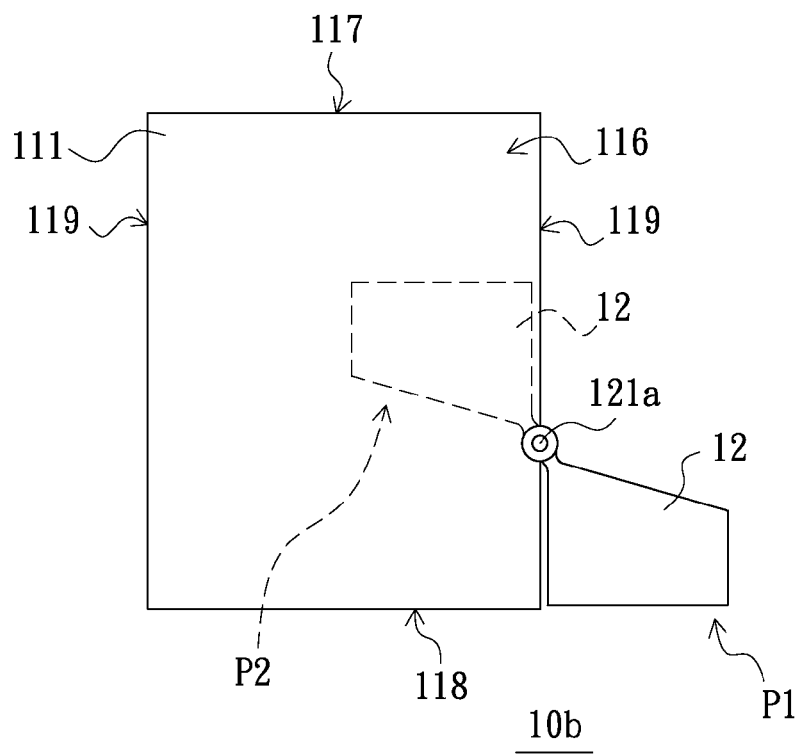
FIG. 7 is a schematic view of the input device of the electronic apparatus in accordance with the third embodiment of the present invention, which is rotated to various positions.

FIG. 6 is a schematic view of an electronic apparatus having a movable input device in accordance with a third embodiment of the present invention. FIG. 7 is a schematic view of the input device of the electronic apparatus in the third embodiment, which is rotated to various positions. Referring to FIGS. 6 and 7, the electronic apparatus 10b in the third embodiment is similar to the electronic apparatus 10a in the second embodiment except that the electronic apparatus 10b only includes one input device 12 and one side surface 119 of the shell 111 defines an opening 120. In the present embodiment, the input device 12 of the electronic apparatus 10b is coupled to the side surface 119 of the shell 111 via a pivoting shaft 121a. The pivoting shaft 121a is substantially perpendicular to the front surface 115 and the rear surface 116 of the shell 111. The opening 120 communicates with a receiving space (not shown) in the shell 111. Thus, the input device 12 can be rotated relative to the shell 111 to be received in the shell 111 through the opening 120.

In detail, the input device 12 is rotated around the pivoting shaft 121a, thereby achieving rotation relative to the shell 111 to enter in the receiving space in the shell 111 through the opening 120. Thus, the volume of electronic apparatus 10b can be reduced so that the electronic apparatus 10b can be carried conveniently.

It is noted that the opening 120 can be defined on the other surfaces of the shell 111, for example, the top surface 117 or the bottom surface 118. The input device 12 is disposed at the position corresponding to the opening 120. In addition, it is also noted that the electronic apparatus 10b can includes two or more input devices 12 and the opening 120 can be increased according to the number of the input devices 12. Moreover, the coupling structure of the input device 12 and the shell 111 is not limited by the present embodiment. Any coupling structure of the input device 12 and the shell 111 that is configured for rotating the input device 12 relative to the shell 111 to receive the input device 12 in the shell 111 through the opening 120 can be feasible. In other embodiment, the input device 12 can be configured for being rotated relative to the shell 111 to be received on the rear surface 116 of the shell 111. In the circumstances, the corresponding opening 120 of the shell 111 can be omitted, and the electronic apparatus can includes two or more input devices 12.

Figure 8:
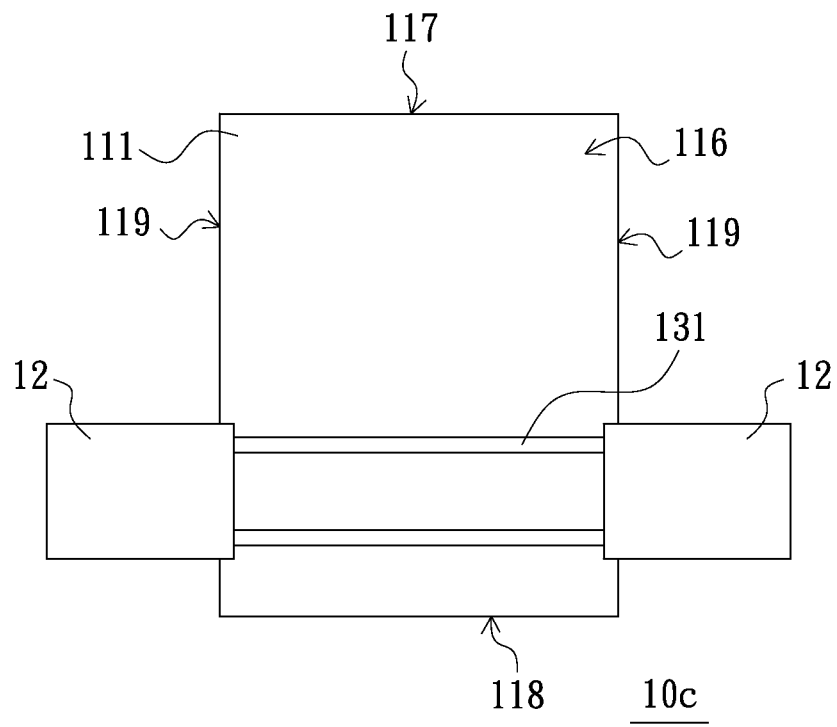
FIG. 8 is a rear, schematic view of the electronic apparatus having two movable input devices in accordance with the fourth embodiment of the present invention.
Figure 9:
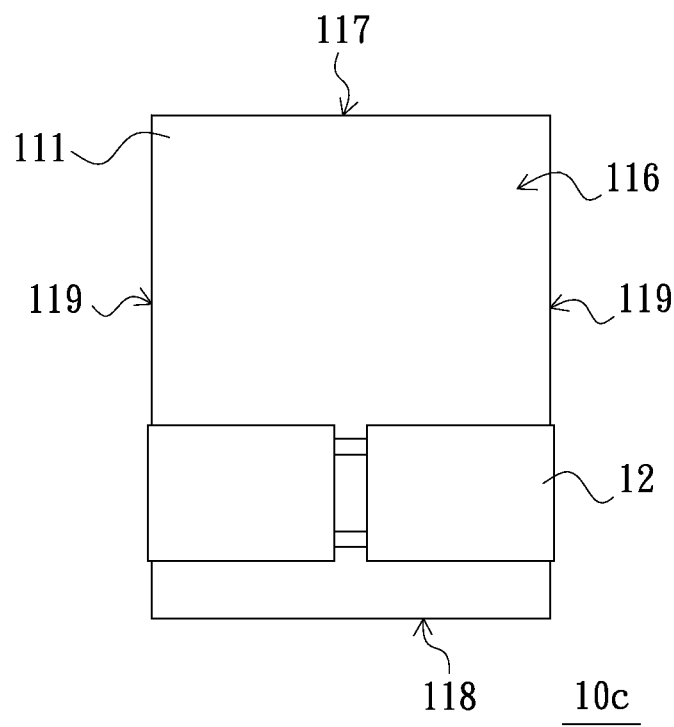
FIG. 9 is a schematic view of the input devices of the electronic apparatus in accordance with the fourth embodiment of the present invention, which are received on the rear surface of the shell of the electronic apparatus.

FIG. 8 is a schematic view of an electronic apparatus having two movable input devices in accordance with a fourth embodiment of the present invention. FIG. 9 is a schematic view of the input devices of the electronic apparatus in the fourth embodiment, which are received on the rear surface of the shell. Referring to FIGS. 8 and 9, the electronic apparatus 10c in the fourth embodiment is similar to the electronic apparatus 10a in the second embodiment except the coupling structure of the two input devices 12 and the shell 111. In the present embodiment, the two input devices 12 of the electronic apparatus 10c are coupled to the shell 111 slidably. The two input devices 12 are configured for being slid relative to the shell 111 so as to be received on the rear surface 116 of the shell 111. Thus, the volume of electronic apparatus 10c can be reduced so that the electronic apparatus 10c can be carried conveniently.

In detail, the rear surface 116 of the shell 111, for example, defines sliding chutes 131. Sliding blocks (not shown) are disposed on the operating surfaces (not shown) of the input devices 12. The sliding chutes 131 cooperates with the corresponding sliding blocks so that the input devices 12 can be slid relative to the shell 111 to be received on the rear surface 116 of the shell 111. It is noted that the coupling structure of the input devices 12 and the shell 111 is not limited by the present embodiment. Any coupling structure of the input devices 12 and the shell 111 that is configured for sliding the input device 12 relative to the shell 111 to receive the input devices 12 on the rear surface 116 of the shell 111 can be feasible.

Figure 10:
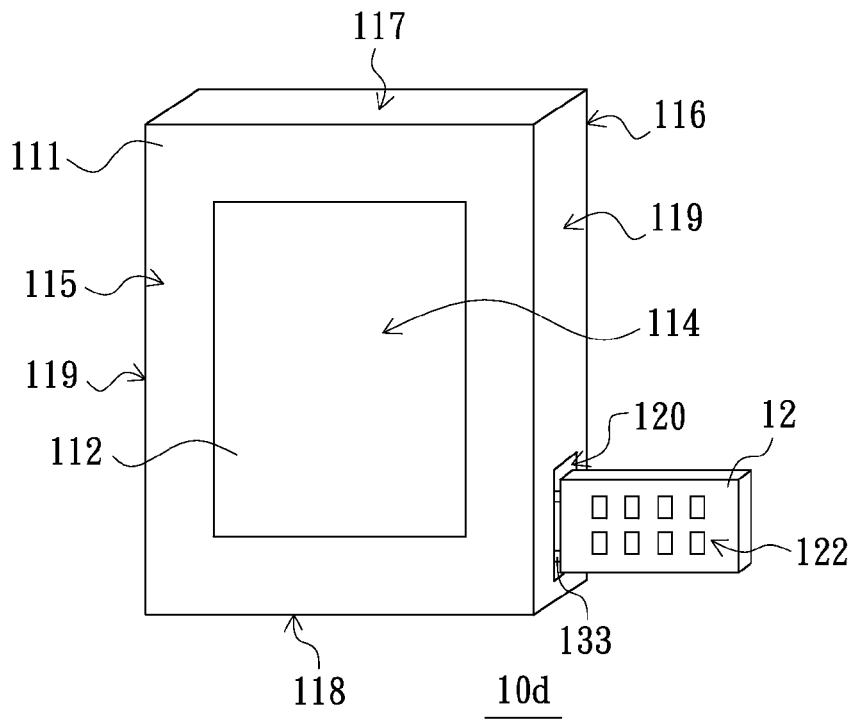
FIG. 10 is a schematic view of the electronic apparatus having a movable input device in accordance with the fifth embodiment of the present invention.
Figure 11:
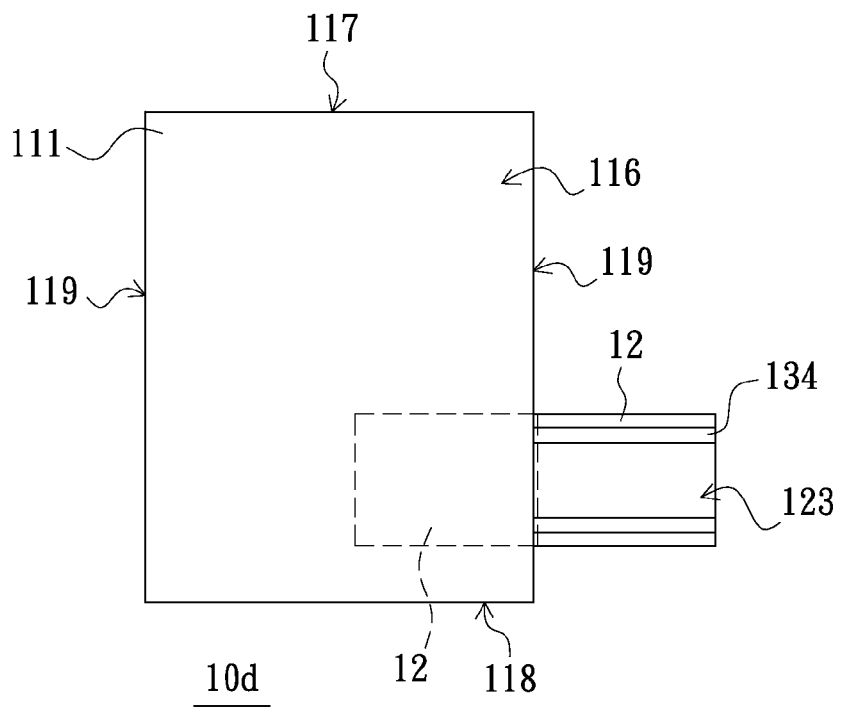
FIG. 11 is a schematic view of the input device of the electronic apparatus in accordance with the fifth embodiment of the present invention, which is received in the shell of the electronic apparatus.

FIG. 10 is a schematic view of an electronic apparatus having a movable input device in accordance with a fifth embodiment of the present invention. FIG. 11 is a schematic view of the input device of the electronic apparatus in the fifth embodiment, which is received in the shell. Referring to FIGS. 10 and 11, the electronic apparatus 10d in the fifth embodiment is similar to the electronic apparatus 10b in the third embodiment except the coupling structure of the input device 12 and the shell 111. In the present embodiment, the input device 12 of the electronic apparatus 10d is coupled to the shell 111 slidably. The input device 12 is configured for being slid relative to the shell 111 so as to be received in the shell 111 through the opening 120 of the side surface 119. Thus, the volume of electronic apparatus 10d can be reduced so that the electronic apparatus 10d can be carried conveniently.

In the present embodiment, the receiving space of the shell 111 communicating with the opening 120 has sliding blocks 133 disposed therein. The rear 123 of the input device 12 defines sliding chutes 134 corresponding to the sliding blocks 133. The sliding chutes 134 cooperates with the corresponding sliding blocks 133b so that the input device 12 can be slid relative to the shell 111 to be received in the shell 111 through the opening 120. It is noted that the coupling structure of the input device 12 and the shell 111 is not limited by the present embodiment. Any coupling structure of the input device 12 and the shell 111 that is configured for sliding the input device 12 relative to the shell 111 to receive the input device 12 in the shell 111 through the opening 120 can be feasible.

It is noted that the opening 120 can be defined on the other surfaces of the shell 111, for example, the top surface 117 or the bottom surface 118. The input device 12 is disposed at the position corresponding to the opening 120. In addition, it is also noted that the electronic apparatus 10b can includes two or more input devices 12 and the opening 120 can be increased according to the number of the input devices 12. In other embodiment, the input device 12 can be configured for being slid relative to the shell 111 to be received on the rear surface 116 of the shell 111. In the circumstances, the opening 120 of the shell 111 can be omitted and the electronic apparatus can includes two or more input devices 12.

The electronic apparatus of the present invention has the following advantageousness:

1. In one embodiment, the two input devices of the electronic apparatus are coupled to the two opposite sides of the shell. When the two input devices are in the extending state for use, it is based on the ergonomics theory. Thus, the user can input data conveniently by use of the two input devices.

2. In one embodiment, the two input devices of the electronic apparatus have an accessorial supporting function. Thus, the user can read the information displayed on the display surface conveniently.

3. The input device of the electronic apparatus is capable of being received by the shell of the electronic apparatus so as to facilitate reducing the volume of the electronic apparatus. Thus, the user can carry the electronic apparatus conveniently.

The above description is given by way of example, and not limitation. ser Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electronic apparatus having movable input device, comprising:
   a main body comprising a shell, a display panel and a processing unit, the display panel and the processing unit being received in the shell, a display surface of the display panel being exposed from the shell; and
   at least an input device coupled to the shell and electrically connected to the processing unit, wherein the input device is configured for being slid relative to the shell along a straight path so as to be received by the shell;
   wherein the shell comprises a front surface, a rear surface, a top surface, a bottom surface and two opposite side surfaces, the display surface of the display panel is exposed from the front surface, the front surface is on an opposite side of the shell to the rear surface, the bottom surface is on an opposite side of the shell to the top surface, the two side surfaces are adjacent to the front surface, the rear surface, the top surface and the bottom surface, the at least an input device is coupled to at least one of the side surfaces respectively, the at least one of the side surfaces defines at least an opening respectively, the at least an input device is received in the shell through the opening, the opening has sliding blocks disposed therein, the rear of the input device defines sliding chutes corresponding to the sliding blocks, the sliding chutes cooperate with the corresponding sliding blocks so that the input device can be slid relative to the shell to be received in the shell through the opening.

2. The electronic apparatus having movable input device as claimed in claim 1, wherein the display surface of the display panel is exposed from the front surface of the shell, and the input device is coupled to the shell slidably.

3. The electronic apparatus having movable input device as claimed in claim 1, wherein the input device is selected form a group consisting of a keyboard, a handwriting board and a pointing device.

4. The electronic apparatus having movable input device as claimed in claim 3, wherein the pointing device is selected from a group consisting of a touch pad, a trackball device and a trackpoint device.

5. The electronic apparatus having movable input device as claimed in claim 1, wherein the electronic apparatus is selected from a group consisting of an electronic book apparatus, a personal digital assistant, an all-in one personal computer, a tablet personal computer, a mobile telephone, a multimedia player and a portable game player.

* * * * *